(12) United States Patent
Sakamoto et al.

(10) Patent No.: US 11,982,653 B2
(45) Date of Patent: May 14, 2024

(54) ION CHROMATOGRAPH AND ION COMPONENT ANALYSIS METHOD

(71) Applicant: SHIMADZU CORPORATION, Kyoto (JP)

(72) Inventors: Katsumasa Sakamoto, Kyoto (JP); Masanori Fujiwara, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 362 days.

(21) Appl. No.: 17/599,768

(22) PCT Filed: Apr. 1, 2019

(86) PCT No.: PCT/JP2019/014487
§ 371 (c)(1),
(2) Date: Sep. 29, 2021

(87) PCT Pub. No.: WO2020/202436
PCT Pub. Date: Oct. 8, 2020

(65) Prior Publication Data
US 2022/0155265 A1 May 19, 2022

(51) Int. Cl.
*G01N 30/38* (2006.01)
*B01D 15/36* (2006.01)
(Continued)

(52) U.S. Cl.
CPC .......... *G01N 30/38* (2013.01); *B01D 15/361* (2013.01); *B01D 15/426* (2013.01); *G01N 2030/027* (2013.01)

(58) Field of Classification Search
CPC .. G01N 30/96; G01N 2030/965; G01N 30/02; G01N 2030/645; G01N 2030/027;
(Continued)

(56) References Cited

U.S. PATENT DOCUMENTS

2002/0162804 A1  11/2002  Srinivasan
2004/0195100 A1  10/2004  Srinivasan
(Continued)

FOREIGN PATENT DOCUMENTS

CN  113227778 A  *  8/2021  ............ G01N 27/70
CN  115541800 A  *  12/2022
(Continued)

OTHER PUBLICATIONS

Office Action in corresponding Chinese Patent Application No. 201980094781.6 dated Aug. 9, 2023, with English machine translation.
(Continued)

*Primary Examiner* — Andre J Allen
(74) *Attorney, Agent, or Firm* — Renner, Otto, Boisselle & Sklar, LLP

(57) ABSTRACT

First and second flow-path portions are opposite to each other, and communicate with each other such that a direction in which an eluent flows through the first flow-path portion and a direction in which an eluent flows through the second flow-path portion are opposite to each other. First and second electrode liquid flow paths are respectively opposite to the first and second flow-path portions. First and second electrode liquids are respectively supplied to the first and second electrode liquid flow paths, such that a direction in which the first electrode liquid flows through the first electrode liquid flow path is same as a direction in which an eluent flows through the first flow-path portion and a direction in which the second electrode liquid flows through the second electrode liquid flow path is same as a direction in which an eluent flows through the second flow-path portion.

9 Claims, 9 Drawing Sheets

(51) Int. Cl.
*B01D 15/42* (2006.01)
*G01N 30/02* (2006.01)

(58) Field of Classification Search
CPC .... G01N 30/64; G01N 30/32; G01N 30/6095; G01N 2030/525; G01N 30/30; G01N 27/62; G01N 30/26; G01N 2030/3038; G01N 30/34; G01N 2030/326; G01N 2030/328; G01N 30/20; G01N 30/56; G01N 2030/3084; G01N 2030/567; G01N 30/62; G01N 30/84; G01N 2030/201; G01N 2030/407; G01N 2030/524; G01N 2030/8405; G01N 2030/8435; G01N 2201/022; G01N 30/38; G01N 30/461; G01N 30/603; G01N 30/6052; G01N 30/86; G01N 30/88; G01N 2030/047; G01N 27/30; G01N 30/06; G01N 30/08; G01N 30/16; G01N 30/462; G01N 30/463; G01N 30/466; G01N 30/468; B01D 15/361; B01D 61/46; B01D 61/44; B01D 15/08; B01D 65/02; B01D 15/24; B01D 15/367; B01D 2311/2697; B01D 61/52; B01D 63/085; B01D 2321/16; B01D 2321/42; B01D 61/464; B01D 61/54; B01D 15/424; B01D 2253/102; B01D 2253/108; B01D 2253/11; B01D 2253/202; B01D 2255/20753; B01D 2256/18; B01D 2257/104; B01D 2257/2064; B01D 2257/702; B01D 2257/704; B01D 2257/80; B01D 2259/40001; B01D 2259/402; B01D 53/053; B01D 61/445; B01D 61/485; B01D 2325/42; B01D 15/22; B01D 15/36; B01D 15/362; B01D 15/426; B01D 2311/2623; B01D 59/00

See application file for complete search history.

(56) References Cited

U.S. PATENT DOCUMENTS

| 2016/0041133 | A1 | 2/2016 | Pohl |
| 2020/0132639 | A1 | 4/2020 | Sakamoto |
| 2020/0147518 | A1 | 5/2020 | Sakamoto |
| 2022/0146476 | A1* | 5/2022 | Fujiwara ............... G01N 30/02 |
| 2022/0163495 | A1* | 5/2022 | Fujiwara ............... G01N 27/62 |

FOREIGN PATENT DOCUMENTS

| JP | 2004-522970 A | 7/2004 | |
| JP | 4122228 B2 | 7/2008 | |
| JP | 2017-524147 A | 8/2017 | |
| WO | 2016/098260 A1 | 6/2016 | |
| WO | WO-2016098260 A1 * | 6/2016 | ............ G01N 30/02 |
| WO | 2019/021352 A1 | 1/2019 | |
| WO | 2019/021353 A1 | 7/2019 | |
| WO | WO-2020194609 A1 * | 10/2020 | ............ G01N 30/02 |

OTHER PUBLICATIONS

International Search Report for corresponding Application No. PCT/JP2019/014487, mailed Jun. 25, 2019.
Written Opinion for corresponding Application No. PCT/JP2019/014487, mailed Jun. 25, 2019 (English machine translation).
Notice of Reasons for Refusal in corresponding Japanese Patent Application No. 2021-511805, with English machine translation.
Decision of Refusal in corresponding Japanese Patent Application No. 2021-511805, dated Dec. 6, 2022, with English machine translation.
Office Action in corresponding Chinese patent Application No. 201980094781.6 dated Nov. 30, 2022, with English machine translation.

* cited by examiner

ION CHROMATOGRAPH AND ION COMPONENT ANALYSIS METHOD

TECHNICAL FIELD

The present invention relates to an ion chromatograph and an ion component analysis method.

BACKGROUND ART

In an ion chromatograph, a sample to be analyzed is introduced into a separation column together with an eluent. A sample is separated into ion species components by passing through the separation column and introduced into a flow cell of a detector together with the eluent. A chromatogram is produced by sequential detection of electrical conductances of the sample that has been introduced into the flow cell. An ion suppressor may be arranged between the separation column and the detector.

In the ion suppressor described in Patent Document 1, an eluent flow path support is arranged between a first regeneration liquid flow path support and a second regeneration liquid flow path support. An eluent flow path, a first regeneration liquid flow path and a second regeneration liquid flow path are respectively formed in the eluent flow path support, the first regeneration flow path support and the second regeneration flow path support.

An eluent from the separation column is introduced into the eluent flow path and then arrives at an electrical conductivity meter. The eluent that has passed through the electrical conductivity meter is introduced into each of the first regeneration liquid flow path and the second regeneration liquid flow path as a regeneration liquid. Ion exchange is performed by electrodialysis between an eluent in the eluent flow path, and the first regeneration liquid flow path and the second regeneration liquid flow path, whereby electrical conductivity of the eluent is lowered.

[Patent Document 1] WO 2019/021352 A1

SUMMARY OF INVENTION

Technical Problem

Background of a chromatogram is reduced by improvement of dialysis efficiency of an ion suppressor. However, background of a chromatogram cannot be reduced sufficiently only by improvement of dialysis efficiency of the ion suppressor. As such, it is desired to develop an ion chromatograph that can sufficiently reduce background of a chromatogram and more sufficiently improve accuracy of sample analysis.

An object of the present invention is to provide an ion chromatograph and an ion component analysis method that enables improvement of accuracy of sample analysis.

Solution to Problem

An aspect according to the present invention relates to an ion chromatograph that includes a separation column that separates a sample included in an eluent into ion species components, an ion suppressor that has an eluent flow path through which the eluent led out from the separation column passes, a first electrode liquid flow path through which a first electrode liquid passes and a second electrode liquid flow path through which a second electrode liquid passes, a detector that detects a sample included in the eluent that has passed through the ion suppressor, and an electrode liquid supplier that supplies each of the first and second electrode liquids to each of the first and second electrode liquid flow paths of the ion suppressor, wherein the eluent liquid flow path includes first and second flow-path portions that are opposite to each other, the first and second flow-path portions communicate with each other such that a direction in which the eluent flows through the first flow-path portion and a direction in which the eluent flows through the second flow-path portion are opposite to each other, the first electrode liquid flow path is arranged to be opposite to the first flow-path portion, the second electrode liquid flow path is arranged to be opposite to the second flow-path portion, and the electrode liquid supplier supplies the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is same as a direction in which the eluent flows through the second flow-path portion.

Another aspect according to the present invention relates to an ion chromatograph that includes a separation column that separates a sample included in an eluent into ion species components, an ion suppressor that has an eluent flow path through which the eluent led out from the separation column passes, a first electrode liquid flow path through which a first electrode liquid passes and a second electrode liquid flow path through which a second electrode liquid passes, a detector that detects a sample included in the eluent that has passed through the ion suppressor, and an electrode liquid supplier that supplies each of the first and second electrode liquids to each of the first and second electrode liquid flow paths of the ion suppressor, wherein the eluent liquid flow path includes first and second flow-path portions that are opposite to each other, the first and second flow-path portions communicate with each other such that a direction in which the eluent flows through the first flow-path portion and a direction in which the eluent flows through the second flow-path portion are opposite to each other, the first electrode liquid flow path is arranged to be opposite to the first flow-path portion, the second electrode liquid flow path is arranged to be opposite to the second flow-path portion, and the electrode liquid supplier supplies the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is opposite to a direction in which the eluent flows through the second flow-path portion.

Yet another aspect according to the present invention relates to an ion chromatograph that includes a separation column that separates a sample included in an eluent into ion species components, an ion suppressor that has an eluent flow path through which the eluent led out from the separation column passes, a first electrode liquid flow path through which a first electrode liquid passes and a second electrode liquid flow path through which a second electrode liquid passes, a detector that detects a sample included in the eluent that has passed through the ion suppressor, and an electrode liquid supplier that supplies each of the first and second electrode liquids to each of the first and second electrode liquid flow paths of the ion suppressor, wherein the eluent liquid flow path includes first and second flow-path portions that are opposite to each other, the first and second flow-path portions communicate with each other such that a direction in which the eluent flows through the first flow-path portion and a direction in which the eluent flows through the second flow-path portion are opposite to each other, the first electrode liquid flow path is arranged to be opposite to the first flow-path portion, the second electrode liquid flow path is arranged to be opposite to the second flow-path portion, and the electrode liquid supplier supplies the first and second electrode liquids to the ion suppressor, such that a direction in which the first electrode liquid flows through the first electrode liquid flow path is opposite to a direction in which the eluent flows through the first flow-path portion and a direction in which the second electrode liquid flows through the second electrode liquid flow path is same as a direction in which the eluent flows through the second flow-path portion.

Yet another aspect according to the present invention relates to an ion component analysis method that includes the steps of supplying an eluent led out from a separation column that separates a sample included in the eluent into ion species components to an ion suppressor, and supplying first and second electrode liquids to the ion suppressor, wherein the ion suppressor has an eluent flow path through which the eluent passes, a first electrode liquid flow path through which the first electrode liquid passes and a second electrode liquid flow path through which the second electrode liquid passes, the eluent liquid flow path includes first and second flow-path portions that are opposite to each other, the first and second flow-path portions communicate with each other such that a direction in which the eluent flows through the first flow-path portion and a direction in which the eluent flows through the second flow-path portion are opposite to each other, the first electrode liquid flow path is arranged to be opposite to the first flow-path portion, the second electrode liquid flow path is arranged to be opposite to the second flow-path portion, and the step of supplying first and second electrode liquids to the ion suppressor includes supplying the first electrode liquid to the first electrode liquid flow path such that a direction in which the first electrode liquid flows through the first electrode liquid flow path is same as a direction in which the eluent flows through the first flow-path portion, and supplying the second electrode liquid to the second electrode liquid flow path such that a direction in which the second electrode liquid flows through the second electrode liquid flow path is same as a direction in which the eluent flows through the second flow-path portion.

Advantageous Effects of Invention

The present invention enables improvement of accuracy of sample analysis.

DESCRIPTION OF EMBODIMENTS (1) Configuration of Ion Chromatograph

Figure 1:
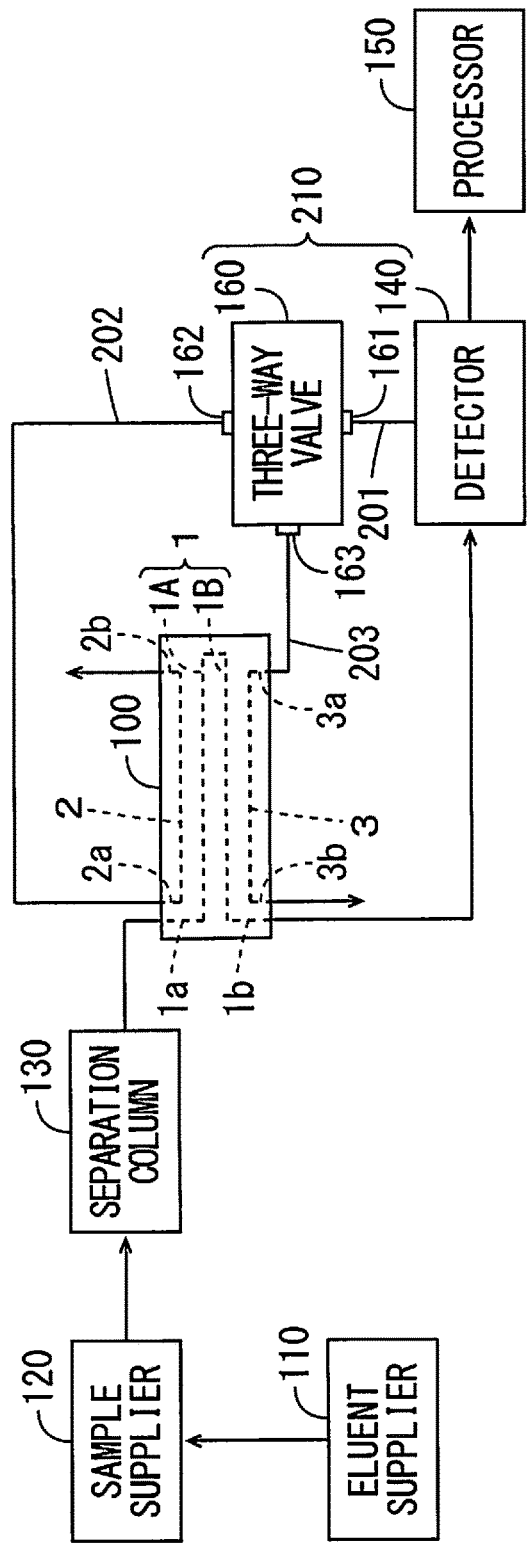
FIG. 1 is a diagram showing the configuration of an ion chromatogram according to one embodiment of the present invention.

An ion chromatograph and an ion component analysis method according to embodiments of the present invention will be described below in detail with reference to the drawings. FIG. 1 is a diagram showing the configuration of the ion chromatograph according to one embodiment of the present invention. As shown in FIG. 1, the ion chromatograph 200 includes an ion suppressor 100, an eluent supplier 110, a sample supplier 120, a separation column 130, a detector 140, a processor 150 and a three-way valve 160.

The eluent supplier 110 includes a chemical liquid bottle, a liquid sending pump and a degassing device, and supplies an eluent such as an aqueous solution as a mobile phase, for example. In the present embodiment, an eluent includes a carbonate eluent. The sample supplier 120 is an injector, and introduces a sample to be analyzed into the separation column 130 together with an eluent that has been supplied by the eluent supplier 110, for example. The separation column 130 is stored in a column oven (not shown) and adjusted to a predetermined constant temperature. The separation column 130 separates an introduced sample into ion species components.

The detector 140 is an electrical conductance detector and sequentially detects the electrical conductances of a sample and an eluent that have passed through an eluent flow path 1, described below, of the ion suppressor 100 from the separation column 130. The processor 150 generates a chromatogram representing the relationship between a retention time of each ion species component and an electrical conductance by processing a result of detection by the detector 140.

The three-way valve 160 has an input port 161 and output ports 162, 163. The input port 161 is connected to the detector 140 by a pipe 201. An eluent that has passed through the detector 140 is introduced into the three-way valve 160 as an electrode liquid from the input port 161 through the pipe 201. The three-way valve 160 branches the electrode liquid that has been introduced from the input port 161 and leads the electrode liquid out from each of the output ports 162, 163. In the present embodiment, an electrode liquid supplier 210 is constituted by the detector 140 and the three-way valve 160.

The ion suppressor 100 has the eluent flow path 1, electrode liquid flow paths 2, 3 and communication paths 1a to 3a, 1b to 3b, and is arranged between the separation column 130 and the detector 140. The electrode liquid flow paths 2, 3, are examples of first and second electrode liquid flow paths, respectively. The communication path 1a, 1b are connected to the both ends of the eluent flow path 1, respectively. The communication paths 2a, 2b are connected to the both ends of the electrode liquid flow path 2, respectively. The communication paths 3a, 3b are connected to the both ends of the electrode liquid flow path 3, respectively.

The ion suppressor 100 has a shape extending in one direction (hereinafter referred to as a flow-path direction).

The communication paths 1a, 2a, 1b, 3b are arranged in one end portion in the flow-path direction. The communication paths 3a, 2b are arranged in the other end portion in the flow-path direction. The electrode liquid flow path 2 and the electrode liquid flow path 3 are arranged to be opposite to each other with the eluent flow path 1 provided therebetween.

The eluent flow path 1 has a turnaround structure and includes flow-path portions 1A, 1B. The flow-path portions 1A, 1B are examples of first and second flow-path portions, respectively. In the present embodiment, the flow-path portion 1A is an upstream portion of the eluent flow path 1, and the flow-path portion 1B is a downstream portion of the eluent flow path 1. The flow-path portion 1B is arranged to turn around and be opposite to the flow-path portion 1A. The flow-path portion 1A and the electrode liquid flow path 2 are opposite to each other, and the flow-path portion 1B and the electrode liquid flow path 3 are opposite to each other.

An eluent including a sample that has passed through the separation column 130 is introduced into the eluent flow path 1 through the communication path 1a in the one end portion of the ion suppressor 100 and flows through the flow-path portion 1A. Thereafter, in the other end portion of the ion suppressor 100, the eluent is introduced into the flow-path portion 1B from the flow-path portion 1A and flows through the flow-path portion 1B. Thereafter, the eluent is led out from the eluent flow path 1 through the communication path 1b in the one end portion of the ion suppressor 100 and is guided to the detector 140 as described above.

The communication path 2a is connected to the output port 162 of the three-way valve 160 by the pipe 202. An electrode liquid that has been led out from the output port 162 is introduced into the electrode liquid flow path 2 from the communication path 2a in the one end portion of the ion suppressor 100 through the pipe 202 and flows through the electrode liquid flow path 2. Thereafter, the electrode liquid is led out from the electrode liquid flow path 2 through the communication path 2b in the other end portion of the ion suppressor 100 to be discarded.

The communication path 3a is connected to the output port 163 of the three-way valve 160 by a pipe 203. An electrode liquid that has been led out from the output port 163 is introduced into the electrode liquid flow path 3 from the communication path 3a in the other end portion of the ion suppressor 100 through the pipe 203 and flows through the electrode liquid flow path 3. Thereafter, the electrode liquid is led out from the electrode liquid flow path 3 through the communication path 3b in the one end portion of the ion suppressor 100 to be discarded.

In the above-mentioned configuration, a direction in which an eluent flows through the flow-path portion 1A and a direction in which an eluent flows through the flow-path portion 1B are opposite to each other. On the other hand, a direction in which an eluent flows through the flow-path portion 1A and a direction in which an electrode liquid flows through the electrode liquid flow path 2 are the same. Further, a direction in which an eluent flows through the flow-path portion 1B and a direction in which an electrode liquid flows through the electrode liquid flow path 3 are the same. In the ion suppressor 100, ion exchange is performed by electrodialysis, so that an electrical conductance of an eluent that has passed through the eluent flow path 1 is lowered.

(2) Configuration of Ion Suppressor

Figure 2:
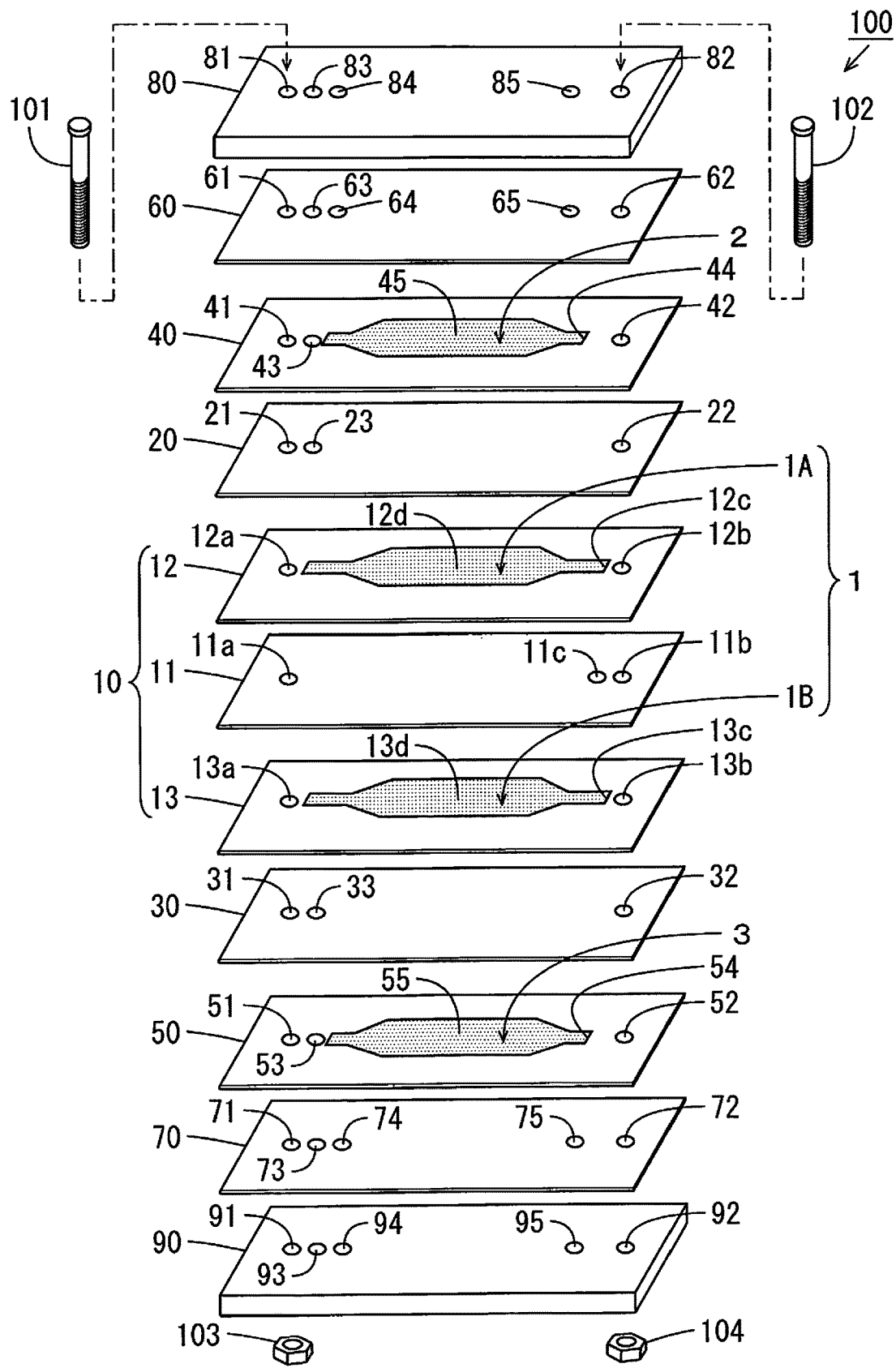
FIG. 2 is an exploded perspective view showing the configuration of an ion suppressor of FIG. 1.

FIG. 2 is an exploded perspective view showing the configuration of the ion suppressor 100 of FIG. 1. As shown in FIG. 2, the ion suppressor 100 includes an ion exchange membrane 11, a pair of eluent seal members 12, 13, a pair of ion exchange membranes 20, 30, a pair of electrode liquid seal members 40, 50, a pair of electrodes 60, 70 and a pair of support members 80, 90. Each of the ion exchange membranes 11, 20, 30, the eluent seal members 12, 13, the electrode liquid seal members 40, 50, the electrodes 60, 70 and the support members 80, 90 has an elongated shape extending in the flow-path direction.

The ion exchange membrane 11 is a cation exchange membrane in a case where ions to be measured are anions, and is an anion exchange membranes in a case where ions to be measured are cations. This also applies to the ion exchange membranes 20, 30. The ion exchange membrane 11 has through holes 11a to 11c. The through hole 11a is arranged in one end portion in the flow-path direction. The through holes 11b, 11c are arranged in this order in the other end portion in the flow-path direction from the other end portion toward the one end portion.

The eluent seal member 12 is formed of a resin material or a rubber material and has through holes 12a, 12b and an opening 12c, for example. The through holes 12a, 12b are respectively arranged in one end portion and the other end portion in the flow-path direction. The opening 12c is arranged between the through hole 12a and the through hole 12b to extend in the flow-path direction. The space in the opening 12c constitutes the flow-path portion 1A. In the present embodiment, a mesh member 12d is provided in the flow-path portion 1A.

The eluent seal member 13 is formed of a material similar to that of the eluent seal member 12, and has through holes 13a, 13b and an opening 13c. The through holes 13a, 13b are respectively arranged in one end portion and the other end portion in the flow-path direction. The opening 13c is arranged between the through hole 13a and the through hole 13b to extend in the flow-path direction. The space in the opening 13c constitutes the flow-path portion 1B. In the present embodiment, a mesh member 13d is provided in the flow-path portion 1B.

The ion exchange membrane 11 and the eluent seal members 12, 13 are stacked with the ion exchange membrane 11 sandwiched by the eluent seal members 12, 13, whereby an eluent seal portion 10 is formed. Further, the end portion of the flow-path portion 1A and the end portion of the flow-path portion 1B are connected to each other through the through hole 11C, whereby the eluent flow path 1 is formed. The flow-path portion 1A and the flow-path portion 1B are opposite to each other with the ion exchange membrane 11 sandwiched therebetween.

The ion exchange membrane 20 has through holes 21 to 23. The through holes 21, 23 are arranged in this order in one end portion in the flow-path direction from the one end portion toward the other end portion. The through hole 22 is arranged in the other end portion in the flow-path direction. The ion exchange membrane 30 has through holes 31 to 33. The through holes 31, 33 are arranged in this order in one end portion in the flow-path direction from the one end portion toward the other end portion. The through hole 32 is arranged in the other end portion in the flow-path direction.

The electrode liquid seal member 40 is formed of a resin material or a rubber material, and has through holes 41 to 43 and an opening 44, for example. The through holes 41, 43 are arranged in this order in one end portion in the flow-path direction from the one end portion toward the other end portion. The through hole 42 is arranged in the other end portion in the flow-path direction. The opening 44 is arranged between the through hole 43 and the through hole 42 to extend in the flow-path direction. The space in the opening 44 constitutes the electrode liquid flow path 2. In the present embodiment, a mesh member 45 is provided in the electrode liquid flow path 2.

The electrode liquid seal member 50 is formed of a material similar to that of the electrode liquid seal member 40, and has through holes 51 to 53 and an opening 54. The through holes 51, 53 are arranged in this order in one end portion in the flow-path direction from the one end portion toward the other end portion. The through hole 52 is arranged in the other end portion in the flow-path direction. The opening 54 is arranged between the through hole 53 and the through hole 52 to extend in the flow-path direction. The space in the opening 54 constitutes the electrode liquid flow path 3. In the present embodiment, a mesh member 55 is provided in the electrode liquid flow path 3.

The electrode 60 is an anode and has through holes 61 to 65, for example. The through holes 61, 63, 64 are arranged in this order in one end portion in the flow-path direction from the one end portion toward the other end portion. The through holes 62, 65 are arranged in this order in the other end portion in the flow-path direction from the other end portion toward the one end portion. The electrode 70 is a cathode and has through holes 71 to 75, for example. The through holes 71, 73, 74 are arranged in this order in one end portion in the flow-path direction from the one end portion toward the other end portion. The through holes 72, 75 are arranged in this order in the other end portion in the flow-path direction from the other end portion toward the one end portion.

The support member 80 is formed of a resin material and has through holes 81 to 86, for example. The through holes 81, 83, 84 are arranged in this order in one end portion in the flow-path direction from the one end portion toward the other end portion. The through holes 82, 85 are arranged in this order in the other end portion in the flow-path direction from the other end portion toward the one end portion. The support member 90 is formed of a material similar to that of the support member 80 and has through holes 91 to 95. The through holes 91, 93, 94 are arranged in this order in one end portion in the flow-path direction from the one end portion toward the other end portion. The through holes 92, 95 are arranged in this order in the other end portion in the flow-path direction from the other end portion toward the one end portion.

From above toward below, the support member 80, the electrode 60, the electrode liquid seal member 40, the ion exchange membrane 20, the eluent seal member 12, the ion exchange membrane 11, the eluent seal member 13, the ion exchange membrane 30, the electrode liquid seal member 50, the electrode 70 and the support member 90 are stacked in this order in an up-and-down direction. In this case, in the one end portion of the ion suppressor 100, the through holes 81, 61, 41, 21, 12a, 11a, 13a, 31, 51, 71, 91 overlap with one another. In the other end portion of the ion suppressor 100, the through holes 82, 62, 42, 22, 12b, 11b, 13b, 32, 52, 72, 92 overlap with one another.

Further, the flow-path portion 1A and the electrode liquid flow path 2 are opposite to each other with the ion exchange membrane 20 sandwiched therebetween, and the flow-path portion 1B and the electrode liquid flow path 3 are opposite to each other with the ion exchange membrane 30 sandwiched therebetween. The through holes 83, 63, 43, 23 overlap with the one end portion of the flow-path portion 1A, and the through holes 93, 73, 53, 33 overlap with the one end portion of the flow-path portion 1B. The through holes 83, 63, 43, 23 constitute the communication path 1a (FIG. 1), and the through holes 93, 73, 53, 33 constitute the communication path 1b (FIG. 1).

The through holes 84, 64 overlap with the one end portion of the electrode liquid flow path 2, and the through holes 85, 65 overlap with the other end portion of the electrode liquid flow path 2. The through holes 94, 74 overlap with the one end portion of the electrode liquid flow path 3, and the through holes 95, 75 overlap with the other end portion of the electrode liquid flow path 3. The through holes 84, 64 constitute the communication path 2a (FIG. 1), and the through holes 85, 65 constitute the communication path 2b (FIG. 1). The through holes 95, 75 constitute the communication path 3a (FIG. 1), and the through holes 94, 74 constitute the communication path 3b (FIG. 1).

Here, a screw member 101 is inserted into the through holes 81, 61, 41, 21, 12a, 11a, 13a, 31, 51, 71, 91 from above toward below. Further, a screw member 102 is inserted into the through holes 82, 62, 42, 22, 12b, 11b, 13b, 32, 52, 72, 92 from above toward below. Nuts 103, 104 are respectively attached to the lower end portions of the screw members 101, 102. Thus, with the eluent seal portion 10, the ion exchange membranes 20, 30, the electrode liquid seal members 40, 50 and the electrodes 60, 70 integrally supported by the support members 80, 90, the ion suppressor 100 is assembled.

(3) Operation of Ion Suppressor

Figure 3:
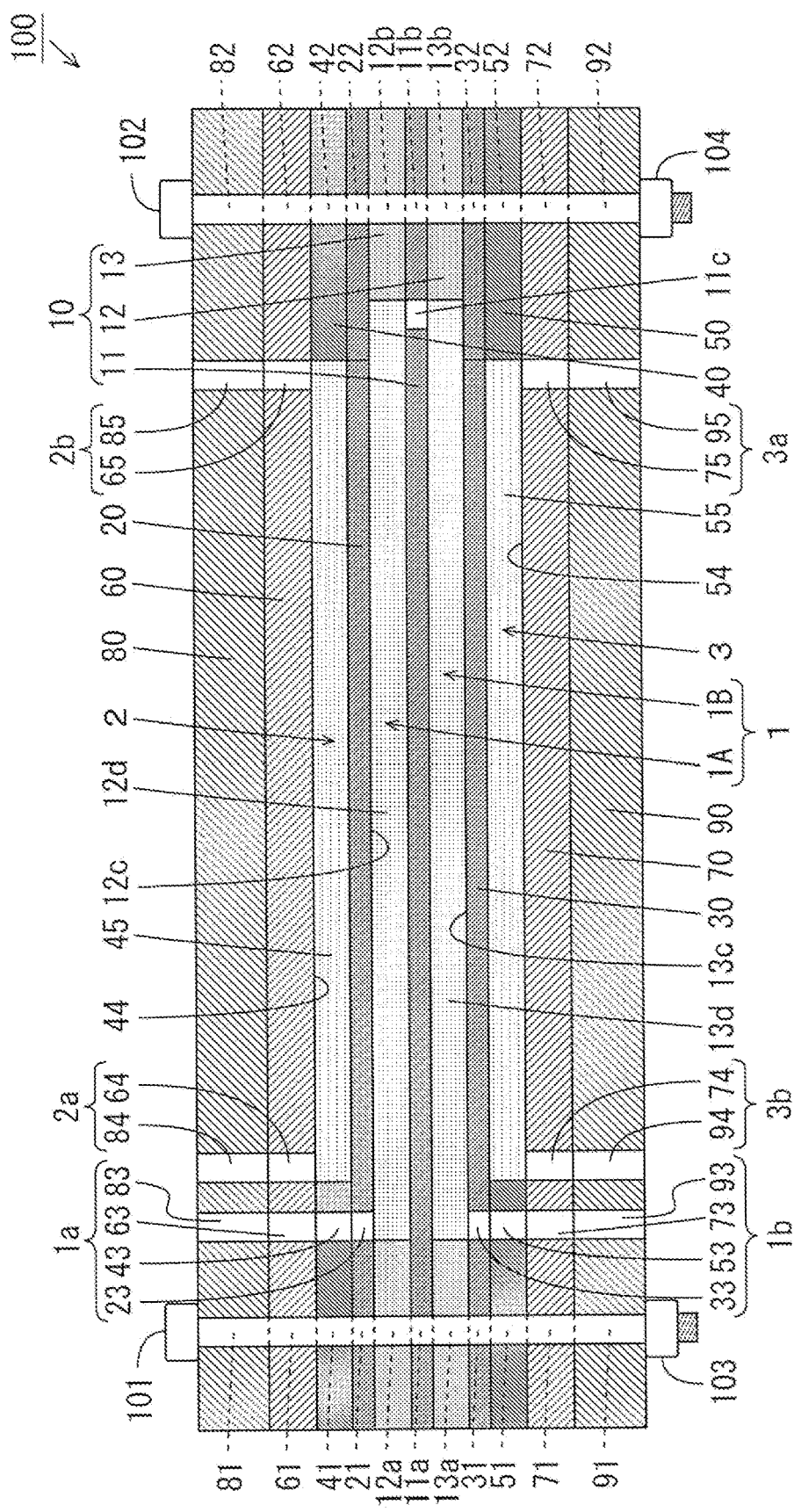
FIG. 3 is a diagram for explaining the operation of the ion suppressor of FIG. 2.

FIG. 3 is a diagram for explaining the operation of the ion suppressor 100 of FIG. 2. An eluent that includes a sample and has passed through the separation column 130 of FIG. 1 is guided to the flow-path portion 1A which is the upstream portion of the eluent flow path 1 through the through holes 83, 63, 43, 23 (the communication path 1a) from the one end portion of the ion suppressor 100 of FIG. 3. Next, the eluent flows through the flow-path portion 1A toward the other end portion and is guided to the flow-path portion 1B which is the downstream portion of the eluent flow path 1 through the through hole 11c.

Thereafter, the eluent flows through the flow-path portion 1B toward the one end portion and is guided to the detector 140 of FIG. 1 through the through holes 33, 53, 73, 93 (the communication path 1b) from the one end portion of the ion suppressor 100. As described above, in the detector 140, the electrical conductances of the sample and the eluent are sequentially detected.

The eluent that has passed through the detector 140 is introduced into the three-way valve 160 (FIG. 1) from the input port 161 (FIG. 1) through the pipe 201 (FIG. 1) as an electrode liquid. Part of the electrode liquid that has been introduced into the three-way valve 160 is guided to the electrode liquid flow path 2 from the through holes 84, 64 (the communication path 2a) in the one end portion of the ion suppressor 100 through the output port 162 (FIG. 1) and the pipe 202 (FIG. 1). The electrode liquid flows through the electrode liquid flow path 2 toward the other end portion and is then discharged to outside through the through holes 65, 85 (the communication path 2b) in the other end portion of the ion suppressor 100.

The other part of the electrode liquid that has been introduced into the three-way valve 160 is guided to the electrode liquid flow path 3 from the through holes 95, 75 (the communication path 3a) in the other end portion of the ion suppressor 100 through the output port 163 (FIG. 1) and the pipe 203 (FIG. 1). The electrode liquid flows through the electrode liquid flow path 3 toward the one end portion and is then discharged to outside through the through holes 74, 94 (the communication path 3*b*) in the one end portion of the ion suppressor 100.

A positive voltage is applied to the electrode 60, and a negative voltage is applied to the electrode 70. In this case, hydrogen ions and oxygen molecules are generated in the electrode liquid flow path 2, and hydroxide ions and hydrogen molecules are generated in the electrode liquid flow path 3, by electrolysis of water. Hydrogen ions generated in the electrode liquid flow path 2 are transmitted through the ion exchange membrane 20 to move to the flow-path portion 1A, and are replaced with cations such as sodium ions or potassium ions in an eluent in the flow-path portion 1A.

The cations with which the hydrogen ions have been replaced in the flow-path portion 1A and the hydrogen ions that have not been replaced in the flow-path portion 1A are transmitted through the ion exchange membrane 11 to move to the flow-path portion 1B. The hydrogen ions that have not been replaced in the flow-path portion 1A are replaced with cations such as sodium ions or potassium ions in an eluent in the flow-path portion 1B. The cations with which the hydrogen ions have been replaced in the flow-path portion 1A or the flow-path portion 1B are transmitted through the ion exchange membrane 30 from the flow-path portion 1B to move to the electrode liquid flow path 3, are combined with hydroxide ions in the electrode liquid flow path 3 and then are led out together with an electrode liquid.

With the above-mentioned operation, ion exchange is performed between an electrode liquid that moves through the electrode liquid flow path 2, between an eluent that moves through the flow-path portion 1A and an eluent that moves through the flow-path portion 1B, and between an eluent that moves through the flow-path portion 1B and an electrode liquid that moves through the electrode liquid flow path 3. Thus, an electrical conductance of an eluent that has passed through the eluent flow path 1 is lowered. As a result, the background of a chromatogram generated by the processor 150 of FIG. 1 is reduced, and accuracy of sample analysis is improved.

(4) Effects

A direction in which an eluent flows through the eluent flow path 1 and a direction in which an electrode liquid flows through the electrode liquid flow paths 2, 3 are opposite, whereby the number of steps in the ion exchange between the eluent and the electrode liquid increases. In this case, dialysis efficiency of the ion suppressor 100 is improved. Conventionally, it was considered to be possible to reduce background of a chromatogram by improving dialysis efficiency. Meanwhile, the inventors of the present invention obtained the finding that, when a direction in which an eluent flowed and a direction in which an electrode liquid flowed were opposite, efficiency of electrodialysis was non-uniform due to gas of oxygen molecules or hydrogen molecules generated by electrolysis.

Specifically, in the upstream portion of the eluent flow path 1, a concentration of cations to be dialyzed is high compared to the downstream portion. Thus, a current flows easily. In this case, a large amount of gas of oxygen molecules or hydrogen molecules are generated in the upstream portion of the eluent flow path 1. The gas inhibits ion exchange between an eluent and an electrode liquid. Therefore, efficiency of electrodialysis in the upstream portion in the eluent flow path 1 is lower than efficiency of electrodialysis in the downstream portion.

As a result of repetitive various experiments and studies, the inventors of the present invention obtained the finding that background of an ion chromatogram increases in a case where efficiency of electrodialysis was non-uniform. As such, in the ion chromatograph 200 according to the present embodiment, the ion suppressor 100 has the eluent flow path 1 through which an eluent passes and the electrode liquid flow paths 2, 3 through which an electrode liquid passes. The flow-path portions 1A, 1B of the eluent flow path 1 are opposite to each other, and communicate with each other such that a direction in which an eluent flows through the flow-path portion 1A and a direction in which an eluent flows through the flow-path portion 1B are opposite to each other. The electrode liquid flow paths 2, 3 are opposite to the flow-path portions 1A, 1B, respectively.

A sample that is led out from the separation column 130 is supplied to the eluent flow path 1 of the ion suppressor 100. An electrode liquid is supplied to each of the electrode liquid flow paths 2, 3 by the electrode liquid supplier 210, such that a direction in which an electrode liquid flows through the electrode liquid flow path 2 is the same as a direction in which an eluent flows through the flow-path portion 1A, and a direction in which an electrode liquid flows through the electrode liquid flow path 3 is the same as a direction in which an eluent flows through the flow-path portion 1B. A sample included in an eluent that has passed through the ion suppressor 100 is detected by the detector 140.

With this configuration, a direction in which an eluent flows and a direction in which an electrode liquid flows are the same, so that efficiency of electrodialysis in the downstream portion of the eluent flow path 1 is degraded as compared to a case where a direction in which an eluent flows and a direction in which an electrode liquid flows are opposite to each other. However, as described above, because efficiency of electrodialysis in the upstream portion of the eluent flow path 1 is degraded by gas generated by electrolysis, efficiency of electrodialysis in the entire eluent flow path 1 is close to being uniform.

Further, the eluent flow path 1 has the flow-path portions 1A, 1B that are opposite to each other, and ion exchange is also performed between an eluent that moves through the flow-path portion 1A and an eluent that moves through the flow-path portion 1B. Therefore, efficiency of electrodialysis in the downstream portion of the eluent flow path 1 is prevented from being excessively degraded. Thus, background of a chromatogram can be sufficiently reduced. As a result, accuracy of sample analysis can be improved.

(5) Modified Examples

(a) First Modified Example

In the following description, a flow of an eluent in the flow-path portion 1A and a flow of an electrode liquid in the electrode liquid flow path 2 that are directed in the same direction and a flow of an eluent in the flow-path portion 1B and a flow of an electrode liquid in the electrode liquid flow path 3 that are directed in the same direction are referred to as flows in parallel directions. On the other hand, a flow of an eluent in the flow-path portion 1A and a flow of an electrode liquid in the electrode liquid flow path 2 that are directed in the opposite directions, and a flow of an eluent in the flow-path portion 1B and a flow of an electrode liquid in the electrode liquid flow path 3 that are directed in the opposite directions are referred to as flows in opposite directions.

Figure 4:
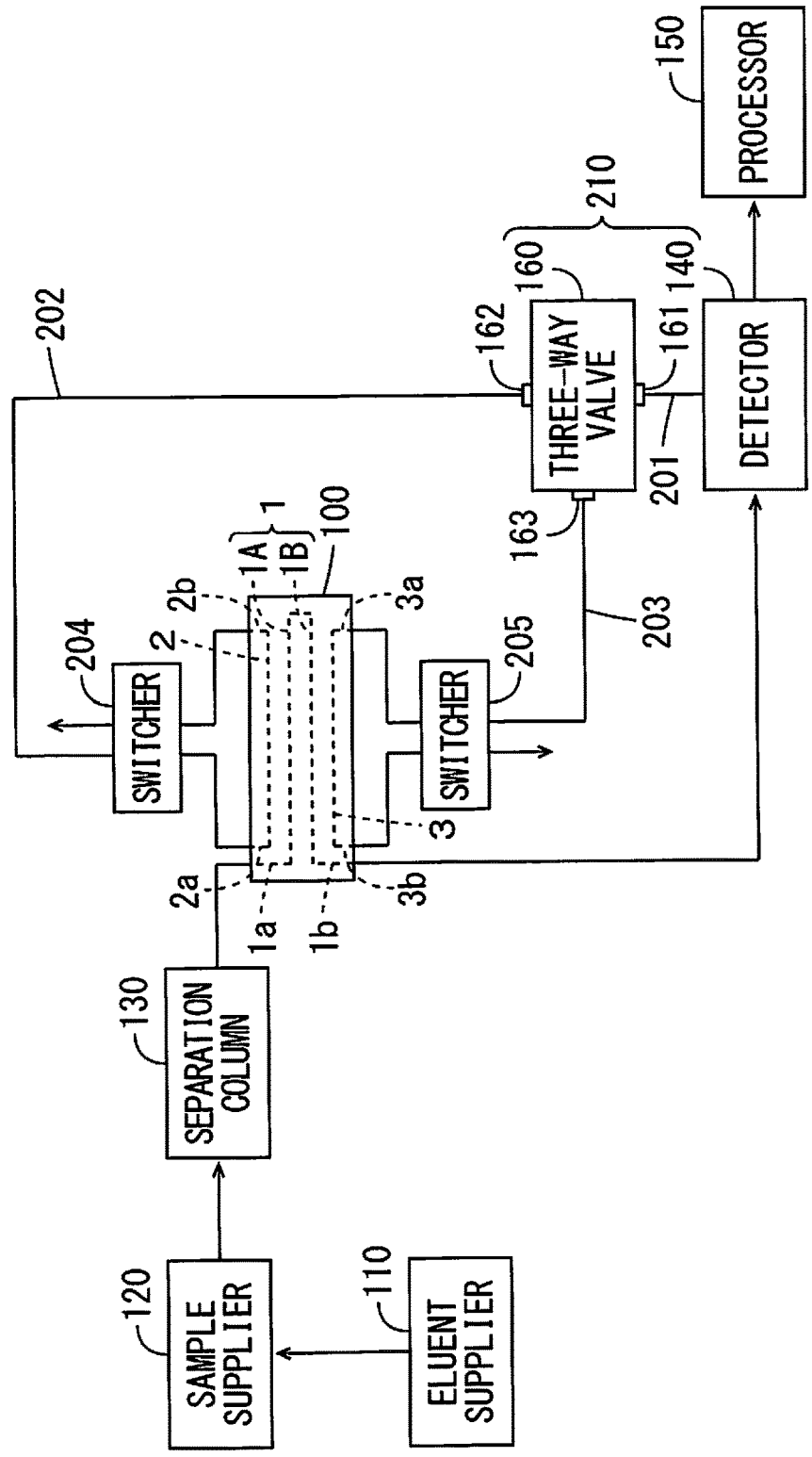
FIG. 4 is a diagram showing the configuration of an ion chromatograph according to a first modified example.

While the ion chromatograph 200 is configured such that an eluent and an electrode liquid flow in parallel directions, the embodiment is not limited to this. The ion chromatograph 200 may be configured to be switchable between having a connection relationship with which an eluent and an electrode liquid flow in parallel directions and having a connection relationship with which an eluent and an electrode liquid flow in opposite directions. FIG. 4 is a diagram showing the configuration of an ion chromatograph 200 according to a first modified example. Differences from the ion chromatograph 200 of FIG. 1 will be described in regard to the ion chromatograph according to the first modified example.

As shown in FIG. 4, the ion chromatograph 200 according to the first modified example further includes switchers 204, 205. Each of the switchers 204, 205 is a direction control valve, for example. The switcher 204 and the switcher 205 may be integrally constituted by a eight-port switch valve, for example. The switcher 204 is connected between communication paths 2a, 2b of the ion suppressor 100 and an output port 162 of a three-way valve 160. The switcher 205 is connected between communication paths 3a, 3b of the ion suppressor 100 and an output port 163 of the three-way valve 160.

Figure 5:
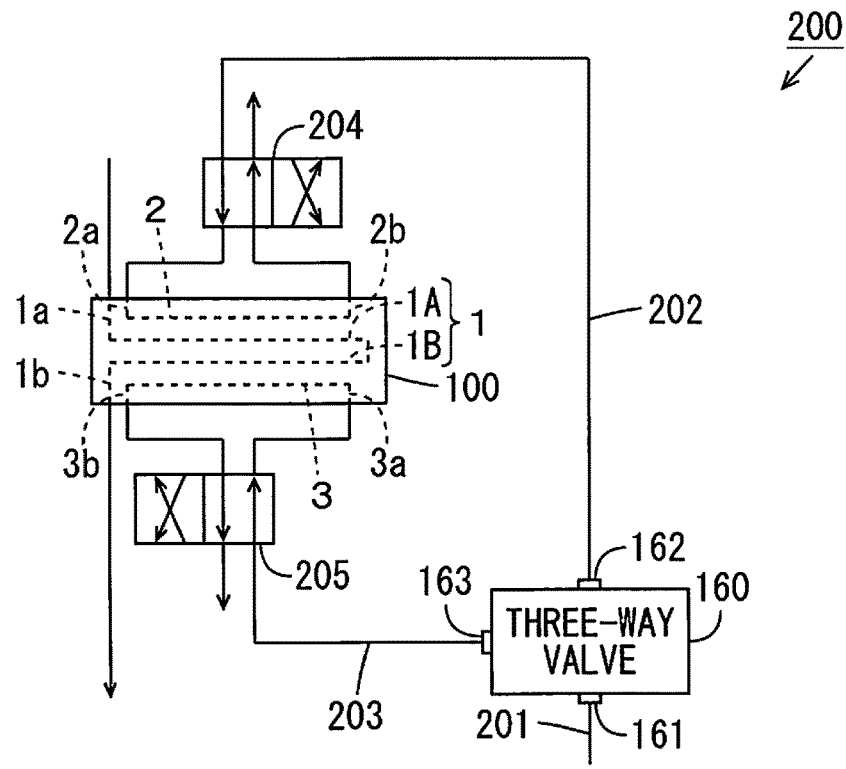
FIG. 5 is a diagram showing the connection relationship of the ion chromatograph.
Figure 6:
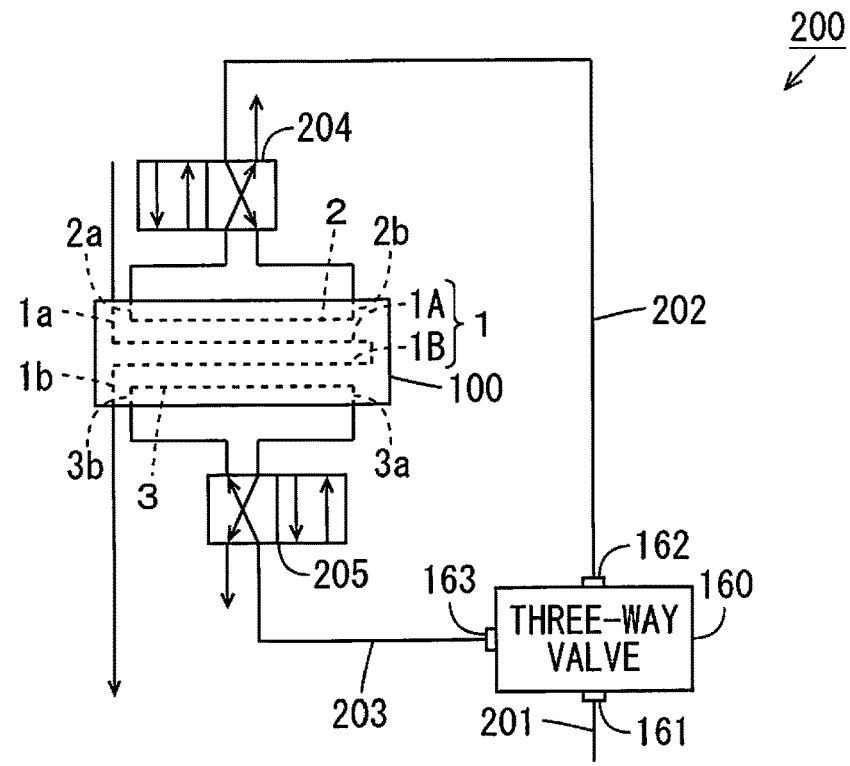
FIG. 6 is a diagram showing the connection relationship of the ion chromatograph.

Each of FIGS. 5 and 6 are diagrams showing the connection relationships of the ion chromatograph 200. A user can switch the ion chromatograph 200 between the connection relationship of FIG. 5 with which an eluent and an electrode liquid flow in parallel directions and the connection relationship of FIG. 6 with which an eluent and an electrode liquid flow in opposite directions by switching the switchers 204, 205.

Specifically, in the ion chromatograph 200 of FIG. 5, an electrode liquid that is output from the output port 162 of the three-way valve 160 is introduced into an electrode liquid flow path 2 from the communication path 2a in one end portion of the ion suppressor 100 through a pipe 202 and the switcher 204 and flows through the electrode liquid flow path 2. Thereafter, the electrode liquid is led out from the electrode liquid flow path 2 through the communication path 2b in the other end portion of the ion suppressor 100 to be discarded through the switcher 204.

An electrode liquid that has been output from the output port 163 of the three-way valve 160 is introduced into an electrode liquid flow path 3 from the communication path 3a in the other end portion of the ion suppressor 100 through the pipe 203 and the switcher 205 and flows through the electrode liquid flow path 3. Thereafter, the electrode liquid is led out from the electrode liquid flow path 3 through the communication path 3b in the one end portion of the ion suppressor 100 to be discarded through the switcher 205. With the connection relationship, an eluent and an electrode liquid flow in parallel directions.

In the ion chromatograph 200 of FIG. 6, an electrode liquid that has been output from the output port 162 of the three-way valve 160 is introduced into the electrode liquid flow path 2 from the communication path 2b in the other end portion of the ion suppressor 100 through the pipe 202 and the switcher 204 and flows through the electrode liquid flow path 2. Thereafter, the electrode liquid is led out from the electrode liquid flow path 2 through the communication path 2a in the one end portion of the ion suppressor 100 to be discarded through the switcher 204.

An electrode liquid that has been output from the output port 163 of the three-way valve 160 is introduced into the electrode liquid flow path 3 from the communication path 3b in the one end portion of the ion suppressor 100 through the pipe 203 and the switcher 205 and flows through the electrode liquid flow path 3. Thereafter, the electrode liquid is led out from the electrode liquid flow path 3 through the communication path 3a in the other end portion of the ion suppressor 100 to be discarded through the switcher 205. With the connection relationship, an eluent and an electrode liquid flow in opposite directions.

The inventors of the present invention carried out experiments and studies for production of a chromatogram using various eluents. As a result, the inventors of the present invention obtained the finding that it was possible to largely reduce background of a chromatogram by causing an eluent of a specific type including a carbonate eluent and an electrode liquid to flow in parallel directions. It is considered that, this is because non-uniformity of efficiency of electrodialysis caused by gas of oxygen molecules or hydrogen molecules generated by electrolysis is alleviated as described above although efficiency of electrodialysis is degraded.

On the other hand, the inventors of the present invention obtained the finding that background of a chromatogram may be more largely reduced in a case where an eluent of a specific type including a hydroxide eluent and an electrode liquid flow in opposite directions. It is considered that, this is because the effect of improving efficiency of electrodialysis outweighs the effect of alleviating non-uniformity of efficiency of electrodialysis.

As such, in a case where a carbonate eluent is to be used, for example, a user switches the switchers 104, 105 such that an eluent and an electrode liquid flow in parallel directions. On the other hand, in a case where a hydroxide eluent is to be used, for example, the user switches the switchers 204, 205 such that an eluent and an electrode liquid flow in opposite directions. This can reduce background of a chromatogram to be produced more reliably and improve accuracy of sample analysis.

While the ion chromatograph 200 includes the switchers 204, 205 in the first modified example, the embodiment is not limited to this. The user may change the pipe 202 between being connected to the communication path 2a and being connected to the communication path 2b and may change the pipe 203 between being connected to the communication path 3a and being connected to the communication path 3b in accordance with the type of an eluent to be used. In this case, the ion chromatograph 200 does not have to include the switcher 204 or 205.

(b) Second Modified Example

Figure 7:
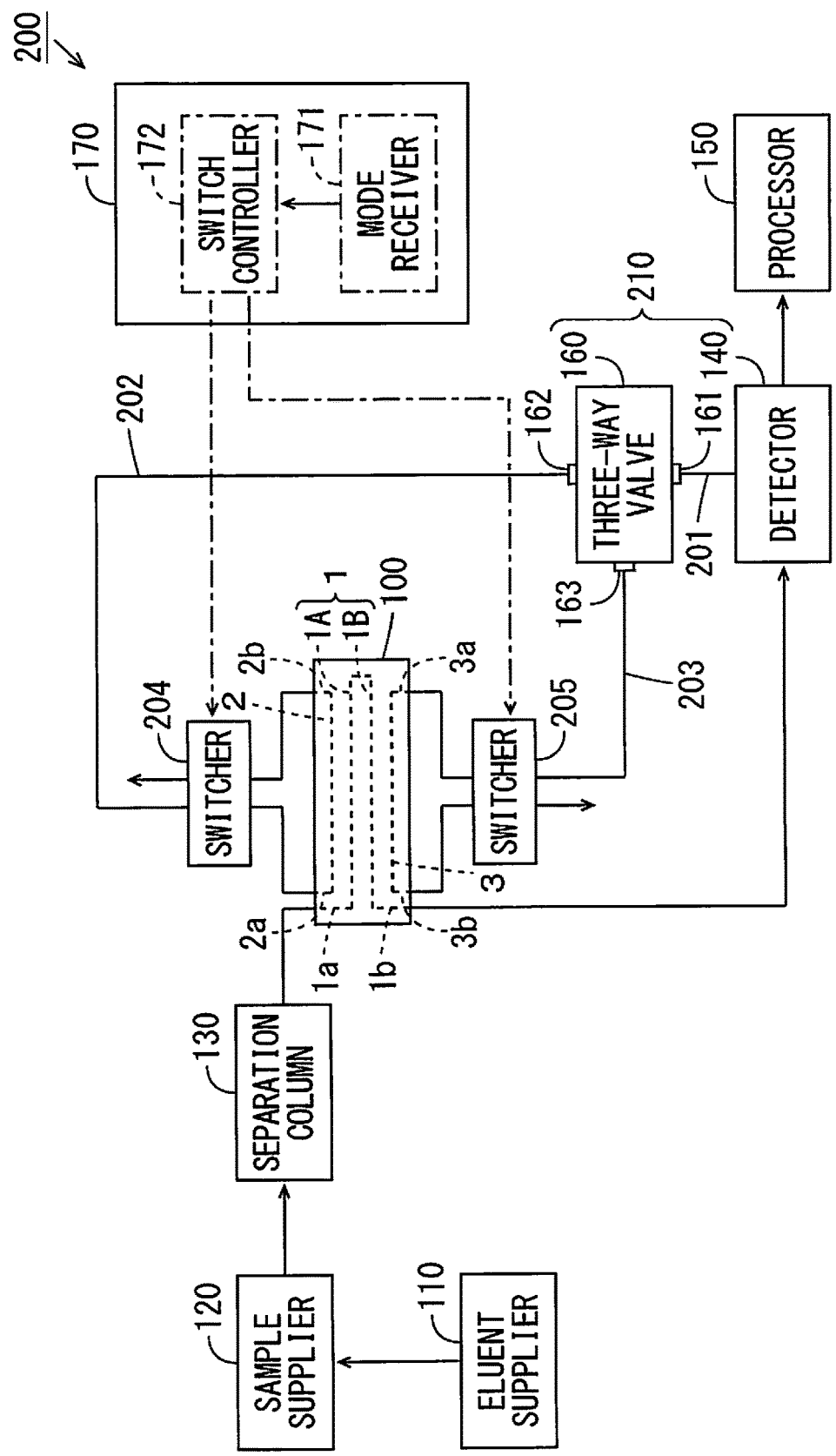
FIG. 7 is a diagram showing the configuration of an ion chromatograph according to a second modified example.

FIG. 7 is a diagram showing the configuration of an ion chromatograph 200 according to a second modified example. Differences from the ion chromatograph 200 of FIG. 4 will be described in regard to the ion chromatograph 200 according to the second modified example. The ion chromatograph 200 according to the second modified example is configured to selectively operate in a first operation mode or a second operation mode, and further includes a controller 170 as shown in FIG. 7.

The controller 170 is constituted by a CPU (Central Processing Unit) or a microcomputer, for example. The controller 170 and a processor 150 may be constituted by the same computer. The controller 170 includes a mode receiver 171 and a switch controller 172 as functions. The functions of the controller 170 are implemented by execution of a predetermined control program by the CPU of the controller 170 or a microcomputer. Part or all of the functions of the controller 170 may be implemented by hardware such as an electronic circuit.

The mode receiver 171 receives selection of an operation mode of the ion chromatograph 200. A user can select the operation mode of the ion chromatograph 200 between a first operation mode and a second operation mode by operating the mode receiver 171. The switch controller 172 switches the switchers 204, 205 in accordance with an operation mode received by the mode receiver 171.

Specifically, in a case where the first operation mode is received by the mode receiver 171, the switch controller 172 switches the switcher 204 such that an eluent flowing through the flow-path portion 1A and an electrode liquid flowing through the electrode liquid flow path 2 flow in parallel directions. Further, the switch controller 172 switches the switcher 205 such that an eluent flowing through the flow-path portion 1B and an electrode liquid flowing through the electrode liquid flow path 3 flow in parallel directions.

In a case where the second operation mode is received by the mode receiver 171, the switch controller 172 switches the switcher 204 such that an eluent flowing through the flow-path portion 1A and an electrode liquid flowing through the electrode liquid flow path 2 flow in opposite directions. Further, the switch controller 172 switches the switcher 205 such that an eluent flowing through the flow-path portion 1B and an electrode liquid flowing through the electrode liquid flow path 3 flow in opposite directions.

In the second modified example, in a case where a carbonate eluent is to be used, for example, the user selects the first operation mode. On the other hand, in a case where a hydroxide eluent is to be used, for example, the user selects the second operation mode. Thus, background of a chromatogram to be produced can be reduced more reliably, and accuracy of sample analysis can be improved.

(c) Third Modified Example

Figure 8:
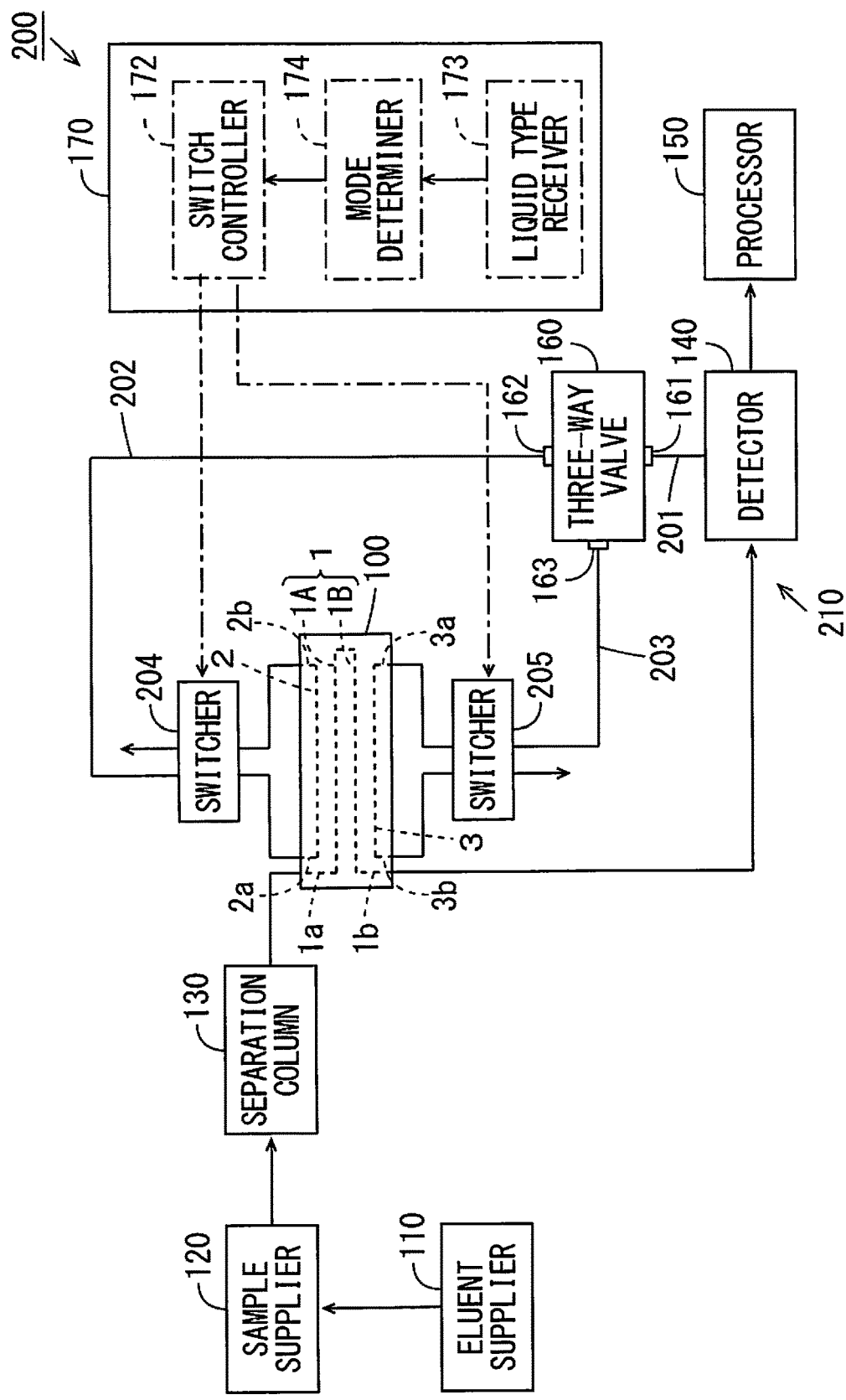
FIG. 8 is a diagram showing the configuration of an ion chromatograph according to a third modified example.

FIG. 8 is a diagram showing the configuration of an ion chromatograph 200 according to a third modified example. In regard to the ion chromatograph 200 according to the third modified example, differences from the ion chromatograph 200 of FIG. 7 will be described. As shown in FIG. 8, in the third modified example, a controller 170 includes a liquid type receiver 173 and a mode determiner 174 as functions instead of the mode receiver 171 of FIG. 7.

The liquid type receiver 173 receives selection of the type of an eluent to be used. A user can select the type of an eluent to be used by operating the liquid type receiver 173. The mode determiner 174 determines an operation mode of the ion chromatograph 200 in accordance with a type of eluent received by the mode receiver 171.

Specifically, in a case where a carbonate eluent is received by the mode receiver 171, for example, the mode determiner 174 determines the operation mode of the ion chromatograph 200 as a first operation mode. In a case where a hydroxide eluent is received by the mode receiver 171, for example, the mode determiner 174 determines the operation mode of the ion chromatograph 200 as a second operation mode.

The switch controller 172 switches switchers 204, 205 such that the ion chromatograph 200 operates in an operation mode determined by the mode determiner 174. Therefore, in a case where a carbonate eluent is to be used, for example, the ion chromatograph 200 operates in the first operation mode. On the other hand, in a case where a hydroxide eluent is to be used, for example, the ion chromatograph 200 operates in the second operation mode. Thus, background of a chromatogram to be produced can be reduced more reliably, and accuracy of sample analysis can be improved.

(d) Fourth Modified Example

Figure 9:
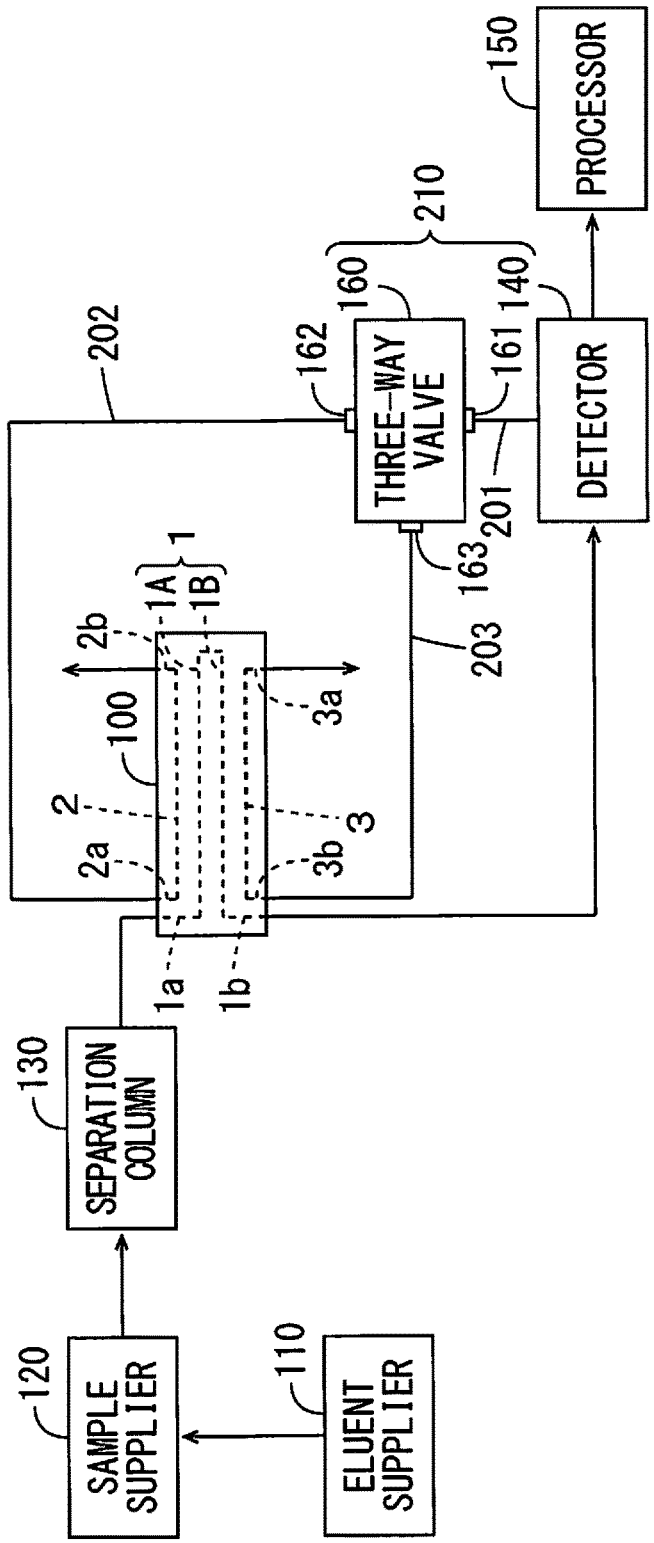
FIG. 9 is a diagram showing the configuration of an ion chromatograph according to a fourth modified example.

FIG. 9 is a diagram showing the configuration of an ion chromatograph according to a fourth modified example. Differences from the ion chromatograph 200 of FIG. 1 will be described in regard to the ion chromatograph 200 according to the fourth modified example. As shown in FIG. 9, the connection relationship between an electrode liquid flow path 2 and a three-way valve 160 in the present example is similar to the connection relationship between the electrode liquid flow path 2 and the three-way valve 160 in the ion chromatograph 200 of FIG. 1.

On the other hand, in regard to an electrode liquid flow path 3, a communication path 3a is not connected to the three-way valve 160, and a communication path 3b is connected to an output port 163 of the three-way valve 160 by a pipe 203. An electrode liquid that has been led out from the output port 163 is introduced into an electrode liquid flow path 3 from the communication path 3b in one end portion of an ion suppressor 100 through a pipe 203 and flows through the electrode liquid flow path 3. Thereafter, the electrode liquid is led out from the electrode liquid flow path 3 through a communication path 3a in the other end portion of the ion suppressor 100 to be discarded.

With the connection relationship, although a direction in which an eluent flows through a flow-path portion 1B and a direction in which an electrode liquid flows through the electrode liquid flow path 3 are opposite to each other, a direction in which an eluent flows through a flow-path portion 1A and a direction in which an electrode liquid flows through the electrode liquid flow path 3 are the same. Therefore, as compared to a case where a direction in which an eluent flows through the flow-path portion 1A and a direction in which an electrode liquid flows through the electrode liquid flow path 2 are opposite to each other, efficiency of electrodialysis in the entire flow-path portion 1A is close to being uniform. Thus, background of a chromatogram can be reduced, and accuracy of sample analysis can be improved.

(e) Fifth Modified Example

Figure 10:
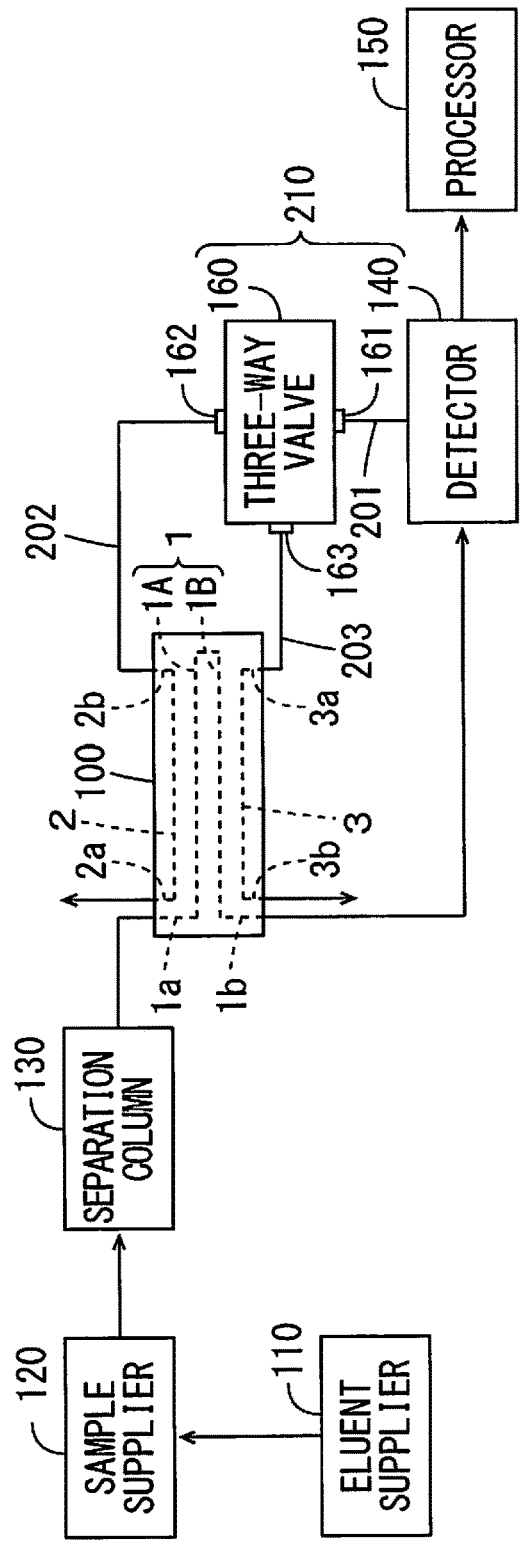
FIG. 10 is a diagram showing the configuration of an ion chromatograph according to a fifth modified example.

FIG. 10 is a diagram showing the configuration of an ion chromatograph 200 according to a fifth modified example. Differences from the ion chromatograph 200 of FIG. 1 will be described in regard to the ion chromatograph 200 according to the fifth modified example. As shown in FIG. 10, the connection relationship between an electrode liquid flow path 3 and a three-way valve 160 in the present example is similar to the connection relationship between the electrode liquid flow path 3 and the three-way valve 160 in the ion chromatograph 200 of FIG. 1.

On the other hand, in regard to an electrode liquid flow path 2, a communication path 2a is not connected to the three-way valve 160, and a communication path 2b is connected to an output port 162 of the three-way valve 160 by a pipe 202. An electrode liquid that has been led out from the output port 162 is introduced into the electrode liquid flow path 2 from the communication path 2b in the other end portion of an ion suppressor 100 through the pipe 202 and flows through the electrode liquid flow path 2. Thereafter, the electrode liquid is led out from the electrode liquid flow path 2 through the communication path 2a in one end portion of the ion suppressor 100 to be discarded.

With the connection relationship, although a direction in which an eluent flows through a flow-path portion 1A and a direction in which an electrode liquid flows through the electrode liquid flow path 2 are opposite to each other, a direction in which an eluent flows through a flow-path portion 1B and a direction in which an electrode liquid flows through the electrode liquid flow path 3 are the same. Therefore, as compared to a case where a direction in which an eluent flows through the flow-path portion 1B and a direction in which an electrode liquid flows through the electrode liquid flow path 3 are opposite to each other, efficiency of electrodialysis in the entire flow-path portion 1B is close to being uniform. Thus, background of a chromatogram can be reduced, and accuracy of sample analysis can be improved.

(6) Other Embodiments (a) While the mesh members 12d, 13d are respectively provided in the flow-path portions 1A, 1B in the above-mentioned embodiment, the embodiment is not limited to this. The mesh member 12d does not have to be provided in the flow-path portion 1A, and the mesh member 13d does not have to be provided in the flow-path portion 1B. While the mesh members 45, 55 are similarly and respectively provided in the electrode liquid flow paths 2, 3 in the above-mentioned embodiment, the embodiment is not limited to this. The mesh member 45 does not have to be provided in the electrode liquid flow path 2, and the mesh member 55 does not have to be provided in the electrode liquid flow path 3.

(b) While the through holes 23, 43, 63, 83 for introduction of an eluent into the flow-path portion 1A are respectively formed in the ion exchange membrane 20, the electrode liquid seal member 40, the electrode 60 and the support member 80 in the above-mentioned embodiment, the embodiment is not limited to this. A plurality of through holes for introduction of an eluent into the flow-path portion 1A may be respectively formed in the ion exchange membrane 11, the eluent seal member 13, the ion exchange membrane 30, the electrode liquid seal member 50, the electrode 70 and the support member 90.

While the through holes 33, 53, 73, 93 for leading an eluent out from the flow-path portion 1B are respectively and similarly formed in the ion exchange membrane 30, the electrode liquid seal member 50, the electrode 70 and the support member 90 in the above-mentioned embodiment, the embodiment is not limited to this. A plurality of through holes for leading an eluent from the flow-path portion 1B may be respectively formed in the ion exchange membrane 20, the eluent seal member 12, the ion exchange membrane 20, the electrode liquid seal member 40, the electrode 60 and the support member 80.

(c) While an eluent to be led out from the detector 140 is supplied to the electrode liquid flow paths 2, 3 as an electrode liquid in the above-mentioned embodiment, the embodiment is not limited to this. An electrode liquid supplier may be provided separately, and an eluent may be supplied to the electrode liquid flow paths 2, 3 by the electrode liquid supplier as an electrode liquid. Further, first and second electrode liquid suppliers may be provided, and electrode liquids may be respectively supplied to the electrode liquid flow paths 2, 3 by the first and second electrode liquid suppliers. In this case, the three-way valve 160 does not have to be provided in the ion chromatograph 200.

(d) While the one end portion and the other end portion of the ion suppressor 100 are fixed by the two screw members 101, 102 in the above-mentioned embodiment, the embodiment is not limited to this. Portions in the vicinity of the four corners of the ion suppressor 100 may be fixed by four screw members, for example. Further, in a case where the through holes 91, 92 of the support member 90 are screw holes, the nuts 103, 104 do not have to be attached to the screw members 101, 102.

(7) Aspects

As in the ion suppressor described in Patent Document 1, a direction in which an eluent flows through an eluent flow path and a direction in which a regeneration liquid flows through a first regeneration liquid flow path and a second regeneration liquid flow path are opposite to each other, so that the number of steps in ion exchange between the eluent and the regeneration liquid increases. Thus, dialysis efficiency of the ion suppressor is improved. Conventionally, it was considered that it was possible to reduce background of a chromatogram by improving efficiency of electrodialysis of an ion suppressor.

On the other hand, the inventors of the present invention obtained the finding that efficiency of electrodialysis was non-uniform because of gas of oxygen molecules or hydrogen molecules generated by electrolysis in a case where a direction in which an eluent flowed and a direction in which a regeneration liquid flowed were opposite to each other. Specifically, in an upstream portion of an eluent flow path, the concentration of cations to be dialyzed is high as compared to a downstream portion, so that a current flows easily. In this case, a large amount of gas of oxygen molecules or hydrogen molecules are generated in the upstream portion of the eluent flow path. The gas inhibits ion exchange between an eluent and a regeneration liquid. Therefore, efficiency of electrodialysis in the upstream portion of the eluent flow path is lower than efficiency of electrodialysis in the downstream portion.

As a result of repetitive various experiments and studies, the inventors of the present invention obtained the finding that background of an ion chromatogram increased in a case where efficiency of electrodialysis was non-uniform. The inventors of the present invention hit upon the below-mentioned configuration based on the finding.

(Item 1) An ion chromatograph according to one aspect may include a separation column that separates a sample included in an eluent into ion species components, an ion suppressor that has an eluent flow path through which the eluent led out from the separation column passes, a first electrode liquid flow path through which a first electrode liquid passes and a second electrode liquid flow path through which a second electrode liquid passes, a detector that detects a sample included in the eluent that has passed through the ion suppressor, and an electrode liquid supplier that supplies each of the first and second electrode liquids to each of the first and second electrode liquid flow paths of the ion suppressor, wherein the eluent liquid flow path may include first and second flow-path portions that are opposite to each other, the first and second flow-path portions may communicate with each other such that a direction in which the eluent flows through the first flow-path portion and a direction in which the eluent flows through the second flow-path portion are opposite to each other, the first electrode liquid flow path may be arranged to be opposite to the first flow-path portion, the second electrode liquid flow path may be arranged to be opposite to the second flow-path portion, and the electrode liquid supplier may supply the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is same as a direction in which the eluent flows through the second flow-path portion.

In the ion chromatograph, the ion suppressor has the eluent flow path through which the eluent passes and the first and second electrode liquid flow paths through which the first and second electrode liquids pass respectively. The first and second flow-path portions of the eluent flow path are opposite to each other, and communicate with each other such that a direction in which an eluent flows through the first flow-path portion and a direction in which an eluent flows through the second flow-path portion are opposite to each other. The first and second electrode liquid flow paths are opposite to the first and second flow-path portions, respectively.

A sample that is led out from the separation column is supplied to the eluent flow path of the ion suppressor. The first and second electrode liquids are respectively supplied to the first and second electrode liquid flow paths of the ion suppressor, such that a direction in which the first electrode liquid flows through the first electrode liquid flow path is the same as a direction in which an eluent flows through the first flow-path portion and a direction in which the second electrode liquid flows through the second electrode liquid flow path is the same as a direction in which an eluent flows through the second flow-path portion. A sample included in the eluent that has passed through the ion suppressor is detected by the detector.

With the configuration, a direction in which an eluent flows and a direction in which the first and second electrode liquids flow are the same, so that efficiency of electrodialysis in the downstream portion of the eluent flow path is degraded as compared to a case where a direction in which the eluent flows and a direction in which the first and second electrode liquids flow are opposite to each other. However, as described above, because efficiency of electrodialysis in the upstream portion of the eluent flow path is degraded by gas generated by electrolysis, efficiency of electrodialysis in the entire eluent flow path is close to being uniform.

Further, the eluent flow path has the first and second flow-path portions that are opposite to each other, and ion exchange is also performed between an eluent that moves through the first flow-path portion and an eluent that moves through the second flow-path portion. Therefore, efficiency of electrodialysis in the downstream portion of the eluent flow path is prevented from being degraded excessively. Thus, background of a chromatogram can be sufficiently reduced. As a result, accuracy of sample analysis can be improved.

(Item 2) The ion chromatograph according to item 1, wherein the eluent may include a carbonate eluent.

In this case, background of a chromatogram can be reduced more sufficiently.

(Item 3) The ion chromatograph according to item 1 may further include a switcher that switches a connection state between the electrode liquid supplier, and the first and second electrode liquid flow paths between a first connection state and a second connection state, wherein the electrode liquid supplier, when the switcher is in the first connection state, may supply the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is same as a direction in which the eluent flows through the second flow-path portion, and when the switcher is in the second connection state, may supply the first and second electrode liquids to the ion suppressor such that, a direction in which the first electrode liquid flows through the first electrode liquid flow path is opposite to a direction in which the eluent flows through the first flow-path portion and a direction in which the second electrode liquid flows through the second electrode liquid flow path is opposite to a direction in which the eluent flows through the second flow-path portion.

As a result of experiments and studies in regard to production of a chromatogram with use of various eluents, the inventors of the present invention obtained the finding that background of a chromatogram was more largely reduced in a case where a direction in which the first and second electrode liquid flowed was opposite to a direction in which an eluent flowed in regard to a specific eluent. It is considered that, this is because the effect of improving efficiency of electrodialysis outweighs the effect of alleviating non-uniformity of efficiency of electrodialysis.

With the above-mentioned configuration, the connection state of the switcher is switched between the first connection state and the second connection state, so that a direction in which the first and second electrode liquids flow can be switched. Therefore, the direction in which the first and second electrode liquids flow is appropriately switched in accordance with the type of an eluent to be used, whereby background of a chromatogram can be reduced more reliably.

(Item 4) The ion chromatograph according to item 3 may further include a mode receiver that selectively receives a first operation mode and a second operation mode as an operation mode of the ion chromatograph, and a switch controller that switches the switcher to the first connection state in a case where the first operation mode is received by the mode receiver, and switches the switcher to the second connection state in a case where the second operation mode is received by the mode receiver.

In this case, it is possible to easily switch the direction in which the first and second electrode liquids flow by selecting the operation mode of the ion chromatograph.

(Item 5) The ion chromatograph according to item 3 may further include a liquid type receiver that selectively receives a carbonate eluent and a hydroxide eluent as a type of the eluent, a mode determiner that determines an operation mode of the ion chromatograph as a first operation mode in a case where a carbonated eluent is received by the liquid type receiver, and determines an operation mode of the ion chromatograph as a second operation mode in a case where a hydroxide eluent is received by the liquid type receiver, and a switch controller switches the switcher to the first connection state in a case where the first operation mode is determined by the mode determiner, and switches the switcher to the second connection state in a case where the second operation mode is determined by the mode determiner.

The inventors of the present invention obtained the finding that, in a case where an eluent is a carbonate eluent, background of a chromatogram is largely reduced when a direction in which the first and second electrode liquids flow is the same as the direction in which an eluent flows. Further, the inventors of the present invention obtained the finding that, in a case where an eluent is a hydroxide eluent, background of a chromatogram is largely reduced when a direction in which the first and second electrode liquids flow is opposite to a direction in which the eluent flows.

With the above-mentioned configuration, in a case where an eluent is a carbonate eluent, the ion chromatograph operates in the first operation mode. In a case where an eluent is a hydroxide eluent, the ion chromatograph operates in the second operation mode. In this case, the operation mode of the ion chromatograph does not have to be selected. Thus, background of a chromatogram can be reduced more reliably and easily.

(Item 6) An ion chromatograph according to another aspect may include a separation column that separates a sample included in an eluent into ion species components, an ion suppressor that has an eluent flow path through which the eluent led out from the separation column passes, a first electrode liquid flow path through which a first electrode liquid passes and a second electrode liquid flow path through which a second electrode liquid passes, a detector that detects a sample included in the eluent that has passed through the ion suppressor, and an electrode liquid supplier that supplies each of the first and second electrode liquids to each of the first and second electrode liquid flow paths of the ion suppressor, wherein the eluent liquid flow path may include first and second flow-path portions that are opposite to each other, the first and second flow-path portions may communicate with each other such that a direction in which the eluent flows through the first flow-path portion and a direction in which the eluent flows through the second flow-path portion are opposite to each other, the first electrode liquid flow path may be arranged to be opposite to the first flow-path portion, the second electrode liquid flow path may be arranged to be opposite to the second flow-path portion, and the electrode liquid supplier may supply the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is opposite to a direction in which the eluent flows through the second flow-path portion.

With the configuration, as compared to a case where a direction in which an eluent flows through the first flow-path portion and a direction in which the first electrode liquid flows through the first electrode liquid flow path are opposite to each other, efficiency of electrodialysis in the entire first flow-path portion is close to being uniform. Thus, background of a chromatogram can be reduced, and accuracy of sample analysis can be improved.

(Item 7) An ion chromatograph according to yet another aspect may include a separation column that separates a sample included in an eluent into ion species components, an ion suppressor that has an eluent flow path through which the eluent led out from the separation column passes, a first electrode liquid flow path through which a first electrode liquid passes and a second electrode liquid flow path through which a second electrode liquid passes, a detector that detects a sample included in the eluent that has passed through the ion suppressor, and an electrode liquid supplier that supplies each of the first and second electrode liquids to each of the first and second electrode liquid flow paths of the ion suppressor, wherein the eluent liquid flow path may include first and second flow-path portions that are opposite to each other, the first and second flow-path portions may communicate with each other such that a direction in which the eluent flows through the first flow-path portion and a direction in which the eluent flows through the second flow-path portion are opposite to each other, the first electrode liquid flow path may be arranged to be opposite to the first flow-path portion, the second electrode liquid flow path may be arranged to be opposite to the second flow-path portion, and the electrode liquid supplier may supply the first and second electrode liquids to the ion suppressor, such that a direction in which the first electrode liquid flows through the first electrode liquid flow path is opposite to a direction in which the eluent flows through the first flow-path portion and a direction in which the second electrode liquid flows through the second electrode liquid flow path is same as a direction in which the eluent flows through the second flow-path portion.

With the configuration, as compared to a case where a direction in which an eluent flows through the second flow-path portion and a direction in which the second electrode liquid flows through the second electrode liquid flow path are opposite to each other, efficiency of electrodialysis in the entire second flow-path portion is close to being uniform. Thus, background of a chromatogram can be reduced, and accuracy of sample analysis can be improved.

(Item 8) An ion component analysis method according to yet another aspect may include the steps of supplying an eluent led out from a separation column that separates a sample included in the eluent into ion species components to an ion suppressor, and supplying first and second electrode liquids to the ion suppressor, wherein the ion suppressor may have an eluent flow path through which the eluent passes, a first electrode liquid flow path through which the first electrode liquid passes and a second electrode liquid flow path through which the second electrode liquid passes, the eluent liquid flow path may include first and second flow-path portions that are opposite to each other, the first and second flow-path portions may communicate with each other such that a direction in which the eluent flows through the first flow-path portion and a direction in which the eluent flows through the second flow-path portion are opposite to each other, the first electrode liquid flow path may be arranged to be opposite to the first flow-path portion, the second electrode liquid flow path may be arranged to be opposite to the second flow-path portion, and the step of supplying first and second electrode liquids to the ion suppressor may include supplying the first electrode liquid to the first electrode liquid flow path such that a direction in which the first electrode liquid flows through the first electrode liquid flow path is same as a direction in which the eluent flows through the first flow-path portion, and supplying the second electrode liquid to the second electrode liquid flow path such that a direction in which the second electrode liquid flows through the second electrode liquid flow path is same as a direction in which the eluent flows through the second flow-path portion.

With the ion component analysis method, efficiency of electrodialysis in the entire eluent flow path is close to being uniform. Further, in the eluent flow path, ion exchange is also performed between an eluent that moves through the first flow-path portion and an eluent that moves through the second flow-path portion, so that efficiency of electrodialysis in the downstream portion of the eluent flow path is prevented from being degraded excessively. Thus, background of a chromatogram can be sufficiently reduced. As a result, accuracy of sample analysis can be improved.

(Item 9) The ion component analysis method according to item, wherein the eluent may include a carbonate eluent, the supplying the first electrode liquid to the first electrode liquid flow path may include supplying the first electrode liquid to the first electrode liquid flow path such that a direction in which the first electrode liquid flows through the first electrode liquid flow path is same as a direction in which the carbonate eluent flows through the first flow-path portion, and the supplying the second electrode liquid to the second electrode liquid flow path may include supplying the second electrode liquid to the second electrode liquid flow path such that a direction in which the second electrode liquid flows through the second electrode liquid flow path is same as a direction in which the carbonate eluent flows through the second flow-path portion.

In this case, background of a chromatogram can be reduced more sufficiently.

(Item 10) The ion component analysis method according to item 8, wherein the eluent may include a carbonate eluent or a hydroxide eluent, and the supplying the first electrode liquid to the first electrode liquid flow path may include supplying the first electrode liquid to the first electrode liquid flow path such that a direction in which the first electrode liquid flows through the first electrode liquid flow path is same as a direction in which the carbonate eluent flows through the first flow-path portion, in a case where the eluent includes the carbonate eluent, and supplying the first electrode liquid to the first electrode liquid flow path such that a direction in which the first electrode liquid flows through the first electrode liquid flow path is opposite to a direction in which the hydroxide eluent flows through the first flow-path portion, in a case where the eluent includes the hydroxide eluent, and the supplying the second electrode liquid to the second electrode liquid flow path may include supplying the second electrode liquid to the second electrode liquid flow path such that a direction in which the second electrode liquid flows through the second electrode liquid flow path is same as a direction in which the carbonate eluent flows through the second flow-path portion, in a case where the eluent includes the carbonate eluent, and supplying the second electrode liquid to the second electrode liquid flow path such that a direction in which the second electrode liquid flows through the second electrode liquid flow path is opposite to a direction in which the hydroxide eluent flows through the second flow-path portion, in a case where the eluent includes the hydroxide eluent.

In this case, background of a chromatogram can be reduced more reliably.

The invention claimed is:

1. An ion chromatograph comprising:
a separation column that separates a sample included in an eluent into ion species components;
an ion suppressor that has an eluent flow path through which the eluent led out from the separation column passes, a first electrode liquid flow path through which a first electrode liquid passes and a second electrode liquid flow path through which a second electrode liquid passes;
a detector that detects a sample included in the eluent that has passed through the ion suppressor; and
an electrode liquid supplier that supplies each of the first and second electrode liquids to each of the first and second electrode liquid flow paths of the ion suppressor, wherein
the eluent liquid flow path includes first and second flow-path portions that are opposite to each other,
the first and second flow-path portions communicate with each other such that a direction in which the eluent flows through the first flow-path portion and a direction in which the eluent flows through the second flow-path portion are opposite to each other,
the first electrode liquid flow path is arranged to be opposite to the first flow-path portion,
the second electrode liquid flow path is arranged to be opposite to the second flow-path portion,
a connection state between the electrode liquid supplier, and the first and second electrode liquid flow paths is configured to be switchable between a first connection state and a second connection state, and
the electrode liquid supplier,
when the connection state is in the first connection state, supplies the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is same as a direction in which the eluent flows through the second flow-path portion, and
when the connection state is in the second connection state, supplies the first and second electrode liquids to the ion suppressor, such that a direction in which the first electrode liquid flows through the first electrode liquid flow path is opposite to a direction in which the eluent flows through the first flow-path portion and a direction in which the second electrode liquid flows through the second electrode liquid flow path is opposite to a direction in which the eluent flows through the second flow-path portion.

2. The ion chromatograph according to claim 1, wherein the eluent includes a carbonate eluent.

3. The ion chromatograph according to claim 1, further comprising:
a switcher that switches a connection state between the electrode liquid supplier, and the first and second electrode liquid flow paths between a first connection state and a second connection state;
a mode receiver that selectively receives a first operation mode and a second operation mode as an operation mode of the ion chromatograph; and
a switch controller that switches the switcher to the first connection state in a case where the first operation mode is received by the mode receiver, and switches the switcher to the second connection state in a case where the second operation mode is received by the mode receiver.

4. The ion chromatograph according to claim 1, further comprising:
a switcher that switches a connection state between the electrode liquid supplier, and the first and second electrode liquid flow paths between a first connection state and a second connection state;
a liquid type receiver that selectively receives a carbonate eluent and a hydroxide eluent as a type of the eluent;
a mode determiner that determines an operation mode of the ion chromatograph as a first operation mode in a case where a carbonated eluent is received by the liquid type receiver, and determines an operation mode of the ion chromatograph as a second operation mode in a case where a hydroxide eluent is received by the liquid type receiver; and a switch controller switches the switcher to the first connection state in a case where the first operation mode is determined by the mode determiner, and switches the switcher to the second connection state in a case where the second operation mode is determined by the mode determiner.

5. An ion chromatograph comprising:
a separation column that separates a sample included in an eluent into ion species components;
an ion suppressor that has an eluent flow path through which the eluent led out from the separation column passes, a first electrode liquid flow path through which a first electrode liquid passes and a second electrode liquid flow path through which a second electrode liquid passes;
a detector that detects a sample included in the eluent that has passed through the ion suppressor; and
an electrode liquid supplier that supplies each of the first and second electrode liquids to each of the first and second electrode liquid flow paths of the ion suppressor, wherein
the eluent liquid flow path includes first and second flow-path portions that are opposite to each other,
the first and second flow-path portions communicate with each other such that a direction in which the eluent flows through the first flow-path portion and a direction in which the eluent flows through the second flow-path portion are opposite to each other,
the first electrode liquid flow path is arranged to be opposite to the first flow-path portion,
the second electrode liquid flow path is arranged to be opposite to the second flow-path portion, and
the electrode liquid supplier supplies the first and second electrode liquids to the ion suppressor, such that a direction in which the first electrode liquid flows through the first electrode liquid flow path is same as a direction in which the eluent flows through the first flow-path portion and a direction in which the second electrode liquid flows through the second electrode liquid flow path is opposite to a direction in which the eluent flows through the second flow-path portion.

6. An ion chromatograph comprising:
a separation column that separates a sample included in an eluent into ion species components;
an ion suppressor that has an eluent flow path through which the eluent led out from the separation column passes, a first electrode liquid flow path through which a first electrode liquid passes and a second electrode liquid flow path through which a second electrode liquid passes;
a detector that detects a sample included in the eluent that has passed through the ion suppressor; and
an electrode liquid supplier that supplies each of the first and second electrode liquids to each of the first and second electrode liquid flow paths of the ion suppressor, wherein
the eluent liquid flow path includes first and second flow-path portions that are opposite to each other,
the first and second flow-path portions communicate with each other such that a direction in which the eluent flows through the first flow-path portion and a direction in which the eluent flows through the second flow-path portion are opposite to each other,
the first electrode liquid flow path is arranged to be opposite to the first flow-path portion,
the second electrode liquid flow path is arranged to be opposite to the second flow-path portion, and
the electrode liquid supplier supplies the first and second electrode liquids to the ion suppressor, such that a direction in which the first electrode liquid flows through the first electrode liquid flow path is opposite to a direction in which the eluent flows through the first flow-path portion and a direction in which the second electrode liquid flows through the second electrode liquid flow path is same as a direction in which the eluent flows through the second flow-path portion.

7. An ion component analysis method including the steps of:
supplying an eluent led out from a separation column that separates a sample included in the eluent into ion species components to an ion suppressor; and
supplying first and second electrode liquids to the ion suppressor, wherein
the ion suppressor has an eluent flow path through which the eluent passes, a first electrode liquid flow path through which the first electrode liquid passes and a second electrode liquid flow path through which the second electrode liquid passes,
the eluent liquid flow path includes first and second flow-path portions that are opposite to each other,
the first and second flow-path portions communicate with each other such that a direction in which the eluent flows through the first flow-path portion and a direction in which the eluent flows through the second flow-path portion are opposite to each other,
the first electrode liquid flow path is arranged to be opposite to the first flow-path portion,
the second electrode liquid flow path is arranged to be opposite to the second flow-path portion,
a connection state between an electrode liquid supplier, which supplies the respective first and second electrode liquids to the respective first and second electrode liquid flow paths of the ion suppressor, and the first and second electrode liquid flow paths is configured to be switchable between a first connection state and a second connection state, and
the step of supplying first and second electrode liquids to the ion suppressor includes
supplying the respective first and second electrode liquids to the first and second electrode liquid flow paths, such that a direction in which the first electrode liquid flows through the first electrode liquid flow path is same as a direction in which the eluent flows through the first flow-path portion and a direction in which the second electrode liquid flows through the second electrode liquid flow path is same as a direction in which the eluent flows through the second flow-path portion when the connection state is in the first connection state, and
supplying the respective first and second electrode liquids to the first and second electrode liquid flow paths, such that a direction in which the first electrode liquid flows through the first electrode liquid flow path is opposite to a direction in which the eluent flows through the first flow-path portion and a direction in which the second electrode liquid flows through the second electrode liquid flow path is opposite to a direction in which the eluent flows through the second flow-path portion when the connection state is in the second connection state.

8. The ion component analysis method according to claim 7, wherein
the eluent includes a carbonate eluent, the supplying the first electrode liquid to the first electrode liquid flow path includes supplying the first electrode liquid to the first electrode liquid flow path such that a direction in which the first electrode liquid flows through the first electrode liquid flow path is same as a direction in which the carbonate eluent flows through the first flow-path portion, and the supplying the second electrode liquid to the second electrode liquid flow path includes supplying the second electrode liquid to the second electrode liquid flow path such that a direction in which the second electrode liquid flows through the second electrode liquid flow path is same as a direction in which the carbonate eluent flows through the second flow-path portion.

9. An ion component analysis method including the steps of:

supplying an eluent led out from a separation column that separates a sample included in the eluent into ion species components to an ion suppressor; and supplying first and second electrode liquids to the ion suppressor, wherein the ion suppressor has an eluent flow path through which the eluent passes, a first electrode liquid flow path through which the first electrode liquid passes and a second electrode liquid flow path through which the second electrode liquid passes, the eluent liquid flow path includes first and second flow-path portions that are opposite to each other, the first and second flow-path portions communicate with each other such that a direction in which the eluent flows through the first flow-path portion and a direction in which the eluent flows through the second flow-path portion are opposite to each other, the first electrode liquid flow path is arranged to be opposite to the first flow-path portion, the second electrode liquid flow path is arranged to be opposite to the second flow-path portion, the step of supplying first and second electrode liquids to the ion suppressor includes supplying the first electrode liquid to the first electrode liquid flow path such that a direction in which the first electrode liquid flows through the first electrode liquid flow path is same as a direction in which the eluent flows through the first flow-path portion, and supplying the second electrode liquid to the second electrode liquid flow path such that a direction in which the second electrode liquid flows through the second electrode liquid flow path is same as a direction in which the eluent flows through the second flow-path portion, the eluent includes a carbonate eluent or a hydroxide eluent, and the supplying the first electrode liquid to the first electrode liquid flow path includes supplying the first electrode liquid to the first electrode liquid flow path such that a direction in which the first electrode liquid flows through the first electrode liquid flow path is same as a direction in which the carbonate eluent flows through the first flow-path portion, in a case where the eluent includes the carbonate eluent, and supplying the first electrode liquid to the first electrode liquid flow path such that a direction in which the first electrode liquid flows through the first electrode liquid flow path is opposite to a direction in which the hydroxide eluent flows through the first flow-path portion, in a case where the eluent includes the hydroxide eluent, and the supplying the second electrode liquid to the second electrode liquid flow path includes supplying the second electrode liquid to the second electrode liquid flow path such that a direction in which the second electrode liquid flows through the second electrode liquid flow path is same as a direction in which the carbonate eluent flows through the second flow-path portion, in a case where the eluent includes the carbonate eluent, and supplying the second electrode liquid to the second electrode liquid flow path such that a direction in which the second electrode liquid flows through the second electrode liquid flow path is opposite to a direction in which the hydroxide eluent flows through the second flow-path portion, in a case where the eluent includes the hydroxide eluent.

* * * * *